US006427761B1

United States Patent
Georges

(10) Patent No.: US 6,427,761 B1
(45) Date of Patent: Aug. 6, 2002

(54) MEAL TRAY WITH CHEMICAL HEATING AND COOLING

(75) Inventor: René Georges, La Tronche (FR)

(73) Assignee: Societe de Constructions de Material Metallique et Electrique-Socamel, Renage (FR)

(*) Notice: Subject to any disclaimer, the term of this patent is extended or adjusted under 35 U.S.C. 154(b) by 0 days.

(21) Appl. No.: 09/446,727

(22) PCT Filed: Jul. 10, 1998

(86) PCT No.: PCT/FR98/01504
§ 371 (c)(1),
(2), (4) Date: Feb. 24, 2000

(87) PCT Pub. No.: WO99/03387
PCT Pub. Date: Jan. 28, 1997

(30) Foreign Application Priority Data

Jul. 16, 1997 (FR) .............................. 97 09018

(51) Int. Cl.⁷ .............................. F25B 29/00; F24J 1/00; F25D 5/00
(52) U.S. Cl. ............................ 165/48.1; 165/63; 165/96; 165/919; 126/263.06; 126/263.09; 99/483; 62/4; 62/457.9
(58) Field of Search ........................... 165/48.1, 58, 60, 165/63, 64, 96, 918, 919; 126/263.01, 263.05, 263.06, 263.09, 246, 269, 268, 262, 261; 62/4, 480, 457.9; 99/467, 470, 483

(56) References Cited

U.S. PATENT DOCUMENTS

| | | | | |
|---|---|---|---|---|
| 397,819 A | * | 2/1889 | Rossi | 62/4 |
| 397,820 A | * | 2/1889 | Rossi | 62/4 |
| 727,432 A | * | 5/1903 | Peter | 62/4 X |
| 1,738,342 A | * | 12/1929 | Zellhoefer | 62/4 |
| 2,229,437 A | * | 1/1941 | Birdsall | 62/4 X |
| 2,883,835 A | * | 4/1959 | Pikey | 62/457.9 X |
| 2,948,123 A | * | 8/1960 | Morrison | 62/457.9 X |
| 3,242,980 A | * | 3/1966 | Bemiss et al. | 165/919 X |
| 3,957,472 A | * | 5/1976 | Donnelly | 62/4 |
| 4,138,504 A | | 2/1979 | Mack et al. | 426/520 |
| 4,386,703 A | * | 6/1983 | Thompson et al. | 126/262 X |
| 4,830,190 A | * | 5/1989 | Inagaki | 126/261 X |
| 4,901,535 A | * | 2/1990 | Sabin et al. | 62/480 X |
| 4,974,419 A | * | 12/1990 | Sabin et al. | |
| 5,088,302 A | * | 2/1992 | Tomizawa et al. | 62/480 |
| 5,159,973 A | | 11/1992 | Pennington et al. | 165/48.1 |
| 5,295,475 A | * | 3/1994 | Kaneko | 126/263.01 |
| 5,404,935 A | * | 4/1995 | Liebermann | 165/918 X |

FOREIGN PATENT DOCUMENTS

| | | | | |
|---|---|---|---|---|
| DE | 29 11 178 A1 | * | 10/1980 | |
| EP | 0 202 662 A1 | * | 11/1986 | |
| EP | 0 521 148 B1 | * | 1/1993 | |
| EP | 0 655 592 A1 | * | 5/1995 | |
| FR | 693092 | | 11/1930 | |
| FR | 982202 | | 6/1951 | |
| FR | 2 393 246 | | 12/1978 | ........... F25B/17/08 |
| FR | 2 420 947 | | 10/1979 | |
| FR | 2 721 696 | | 12/1995 | ........... F25B/30/04 |
| GB | 1190777 | * | 5/1970 | ............ 126/263.01 |
| JP | 4-309759 | * | 11/1992 | |
| JP | 8-61801 | * | 3/1996 | |
| WO | WO 97/0575 | | 3/1997 | ........... F25D/16/00 |
| WO | 99/04206 | * | 1/1999 | |

* cited by examiner

Primary Examiner—Ljiljana Ciric
(74) Attorney, Agent, or Firm—Pearne & Gordon LLP

(57) ABSTRACT

A meal trolley has an insulated casing and food dishes or plates supported therein for cooling and heating by thermo-chemical reactions. The reagents of the chemical reactions are stored in containers and reservoirs carried by the trolley and selectively connected to provide the self-contained cooling or heating.

14 Claims, 4 Drawing Sheets

FIG_1

MEAL TRAY WITH CHEMICAL HEATING AND COOLING

BACKGROUND OF THE INVENTION AND RELATED ART

The invention relates to trolleys and more particularly to trolleys for transporting or conveying prepared foods with cooling and/or warming thereof. The trolleys are ud, for example, in hospitals and retirement homes and in various means of public transportation.

A trolley of this type is already known from FR-A-2 684281 and from WO-97/09575. The trolley comprises a casing with a heat insulating wall inside which the food dishes are mounted. Means are provided for defining a first zone and a second zone, and these defining means may be a heat insulating partition or may be a virtual partition represented by the fact that the food dishes are covered with a dish-cover made of a heat insulating material, all the parts under the dish-cover on the one side of the trolley representing the first zone and on the other side the second zone. The first zone is generally designed to receive part of the dishes on which food is deposited intended to be consumed cold. It consists of a zone which must be kept at a low temperature, usually at around 3° C. On the other hand, the second zone is intended to receive food which must be consumed hot. This zone is first of all kept at a cold temperature of 3° C. for example, and then before the meal is consumed, is brought to a higher temperature, in particular 65° C. so that the food is reheated and may be served hot. To this end, the trolley includes a first device for cooling the first zone, a second device for cooling the second zone and a device for heating the second zone.

The disadvantage of trolleys known up to now is that devices for cooling by a refrigerating fluid or by absorption, both for the first zone as well as for the second zone, are operating as soon as they are put onto the trolley, even though they are not to be used at this time. As they can only provide a limited cooling capacity, they must be put on the trolley at the last moment or adapted to have the capacity to provide less cooling, so that the trolley can only keep food cold for a shorter time.

SUMMARY OF THE INVENTION

According to the invention, each cooling device comprises a first container for a gas, and optionally a first solid reagent capable of reacting with the gas, and a second container for a second solid reagent capable of reacting with the gas and which, if a first solid reagent is provided, is able to react more vigorously with the gas than the first solid reagent. The containers communicate with each other via a conduit provided with a valve. The first container of the first cooling device is placed in the first zone, while the second container of the first cooling device is placed outside the two zones. The first container of the second cooling device is placed in the second zone, while the second container of the second cooling device is placed outside the two zones.

The cooling devices operate by a thermochemical process, and they are actuated when the valve is opened. In this manner, the capacity of the cooling devices to produce cooling is only used deliberately and selectively.

According to one particularly preferred embodiment, the heating device comprises a first reservoir for a gas and optionally a first solid product able to react with the gas and a second reservoir for a second solid product able to react which, if a first solid product is provided, is able to react more vigorously with the gas than the first solid product, communicating with each other via a conduit provided with a valve, the first reservoir being placed outside the two zones, while the second reservoir is placed in the second zone.

The same advantages are thus obtained for the heating device as for the cooling devices, with the supplementary advantage that since the heating device is in this case entirely self contained and mounted on board the trolley, it is possible to operate it in at any moment whatsoever without being dependent on a source of electrical power at a fixed point. The heating can be started while the food dishes are carried in the trolleys. This enables the waiting time to be reduced.

In accordance with a second embodiment, it is possible to individualize more satisfactorily the cooling and/or heating of prepared dishes placed on the various plates. To that end, individual cooling and/or heating zones are provided for each prepared dish in order to obtain individual cooling or individual cooling and/or heating.

The gas may be ammonia or its derivatives, in particular alkylamines with $C_1$ to $C_8$, for example monomethylamine, dimethylamine, but also water, $CO_2$, $SO_2$, $SO_3$ or $H_2$. The solid adsorbent reagent may be a salt, such as a halide, a pseudohalide, a carbonate, a sulfate, a nitrate, an oxide or a metallic nitride, which, preferably, is in a natural expanded graphite matrix. The endothermicity of the reaction gives the desired cooling. As metals of salts constituting the solid reagents, use may in particular be made of the salts of the alkaline earth metals, zinc salts, manganese salts, iron salts and nickel salts. As a salt, reference may in particular be made to $MnCl_2$, $SrCl_2$, $SrBr_2$ to maintain the temperature at 3° C. and $NiCl_2$, $MgCl_2$, $MgBr_2$ and $NiBr_2$ to maintain the temperature at −20° C. When couples of reagents or solid products are provided, these may be for example $NiCl_2$, $MgCl_2$, $MgBr_2$, $NiBr_2$, $NiCl_2$, $NiBr_2$ according to the desired temperatures.

BRIEF DESCRIPTION OF THE DRAWINGS

In the accompanying drawings, given solely by way of example.

DETAILED DESCRIPTION OF THE INVENTION

Figure 1:
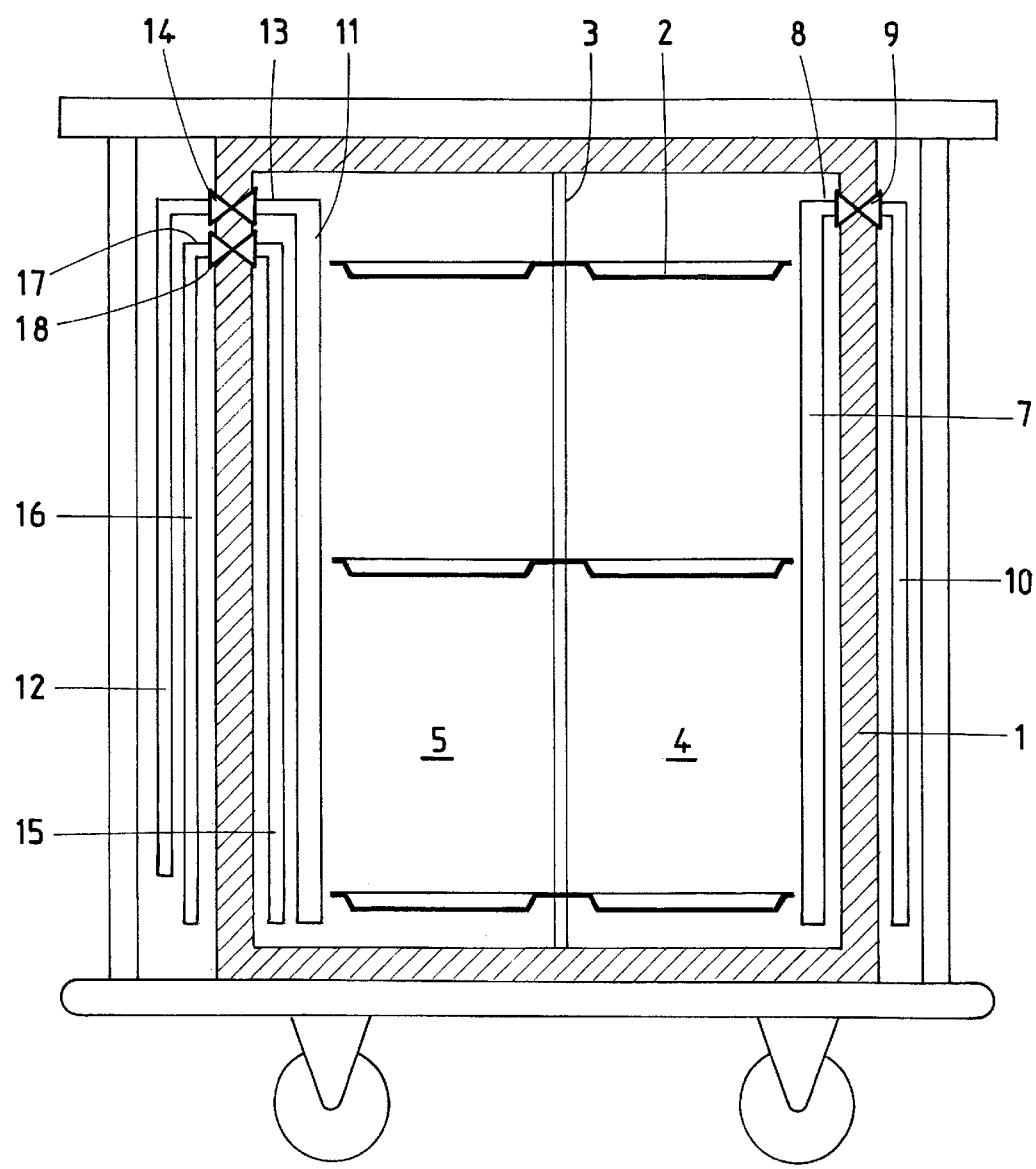
FIG. 1 is a sectional view of a trolley according to the invention.

The trolley shown in FIG. 1 has a casing 1 with an interior heat insulating partition 3 on which are mounted food dishes or plates 2. The plates 2 are spread out horizontally while being superimposed. They pass through the heat insulating partition 3 so that each plate includes a depression situated in a cold zone 4 and a depression situated in a zone 5, referred to as the cold/hot zone since it must be kept initially at a cold temperature and then brought, for example, to 65° C.

To this end, cooling devices are provided at each side of the casing 1, which extend outside the plane of FIG. 1.

The cooling device of the cold zone 4 includes a first container 7 filled with $NH_3$ and $BaCl_2$. This first container communicates via a conduit 8 provided with a valve 9 with a second container 10 filled with $MnCl_2$.

Similarly there is a first container 11, filled with $BaCl_2$, in the zone 5 and a second container 12, filled with $MnCl_2$, located remote of the zone 5. The containers 11 and 12 communicate with each other via a conduit 13 provided with a valve 14 to provide the second cooling device. A heating device is also situated beside this cooling device, only on the side of the zone 5, having a reservoir 15 filled with $MnCl_2$ communicating with a reservoir 16 filled with $BaCl_2$ via a conduit 17 provided with a valve 18. The zone 4 is farther away from the container 10 than from the container 7. The zone 5 is farther away from the container 12 than from the container 11 and is farther away from the reservoir 16 than from the reservoir 15. The containers 10 and 12 and the reservoir 16 are located outside the casing, whereas the other containers and reservoir are located inside the casing.

In the embodiment of FIG. 1, each first container and/or first reservoir extends substantially perpendicularly to the plates. In accordance with another aspect of the invention, it is possible to stop the heating means by turning a valve.

Figure 2:
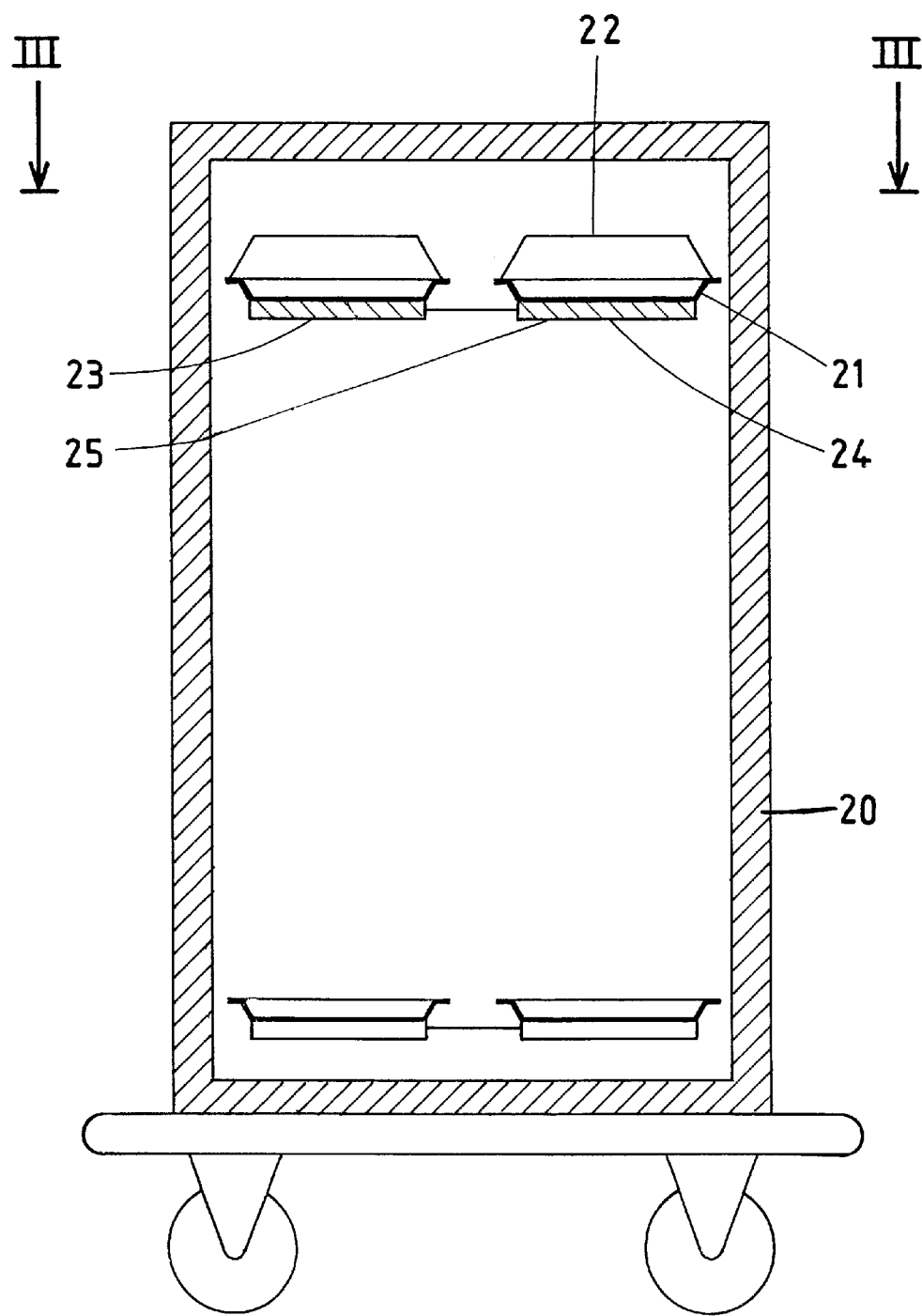
FIG. 2 is a partial sectional view of a variant of the trolley according to the invention.

In FIG. 2, the trolley comprises a casing 20 with a heat insulating wall enclosing mounted food dishes or plates 21, only two of these plates being represented. Each depression in a given plate is covered with a dish-cover 22 made of heat insulating material. The dish-covers 22 determine a cold zone and a warm zone, on the one hand for the cold depressions and on the other hand for the warm depressions of the plate. More particularly, a sub-container 23 is provided under each cold depression of the plate 21. Under each hot depression of the plate 21, both a sub-container 24 and a sub-reservoir 25 are provided and interlaced as shown in FIG. 5 for respectively providing cooling and heating.

Figure 4:
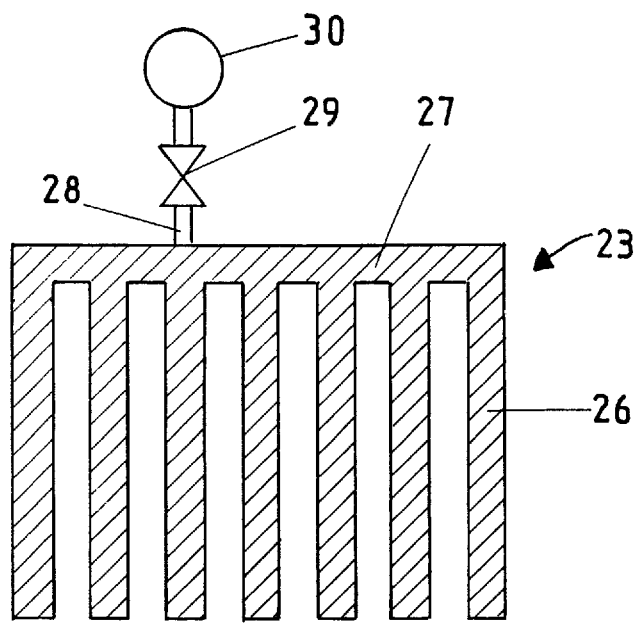
FIG. 4 is a top plan view of the cooling device used in the variant of FIG. 2.

FIG. 4 represents one of the sub-containers 23. The sub-container 23 has seven fingers 26 connected by a manifold 27. The manifold 27 extends to a conduit 28 having a valve 29 and arranged to communicate with a reservoir 30. The reservoir 30 contains $MnCl_2$ and the sub-container 23 contains $BaCl_2$.

Figure 5:
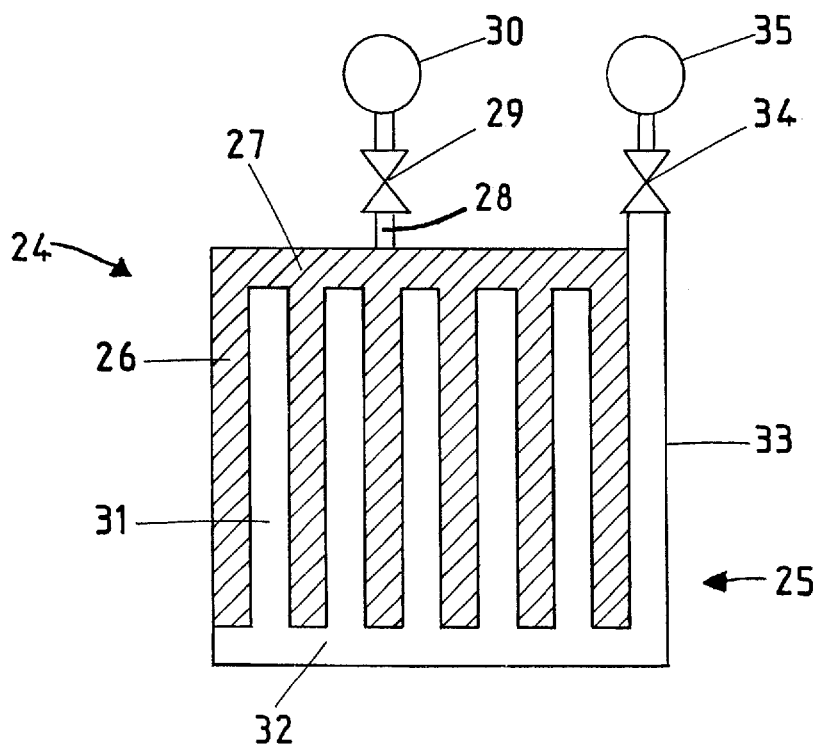
FIG. 5 is a top plan view of the combined cooling and heating device used in the variant of FIG. 2.

As shown in FIG. 5, the sub-container 24 has only six fingers 26, but it is otherwise similar to the sub-container 23. Accordingly, the fingers 26 are connected by the manifold 27 and conduit 28 including valve 29 to the reservoir 30.

As also shown in FIG. 5, the sub-reservoir 25 has five fingers 31 connected to a common collector 32. The collector 32 is connected by a conduit 33 having a valve 34 to a reservoir 35. The fingers 31 contain $MnCl_2$ and the reservoir 35 contains $BaCl_2$. The fingers 26 are interlaced with the fingers 31.

Figure 3:
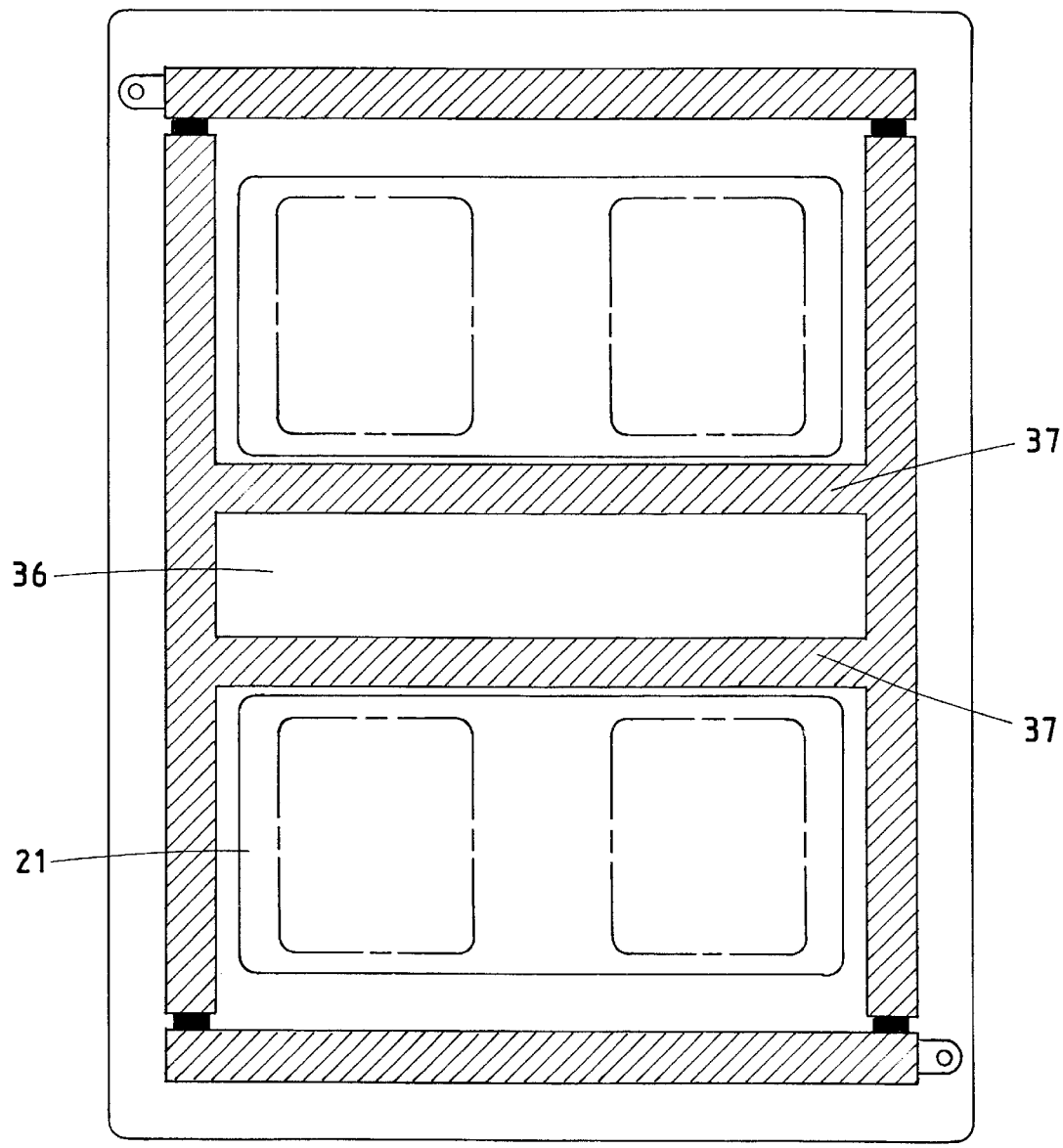
FIG. 3 is a sectional view along the line III—III of FIG. 2.

FIG. 3 is a sectional view along the line III—III of FIG. 2. The food dishes or plates 21 are stacked to either side of a service duct 36 in which the reservoirs 30 and 35 are housed. This service duct is separated from the zones where the plates are situated by heat insulating partitions 37.

Another embodiment consists of positioning the reservoir 16 in the zone 4 and the reservoir 15 in the zone 5. This enables the zone 4 to be kept cold provided the operation of the device 7, 10 is shut down, which prevents heat from being discharged to the environment, when the temperature is raised again.

What is claimed is:

1. A trolley comprising a casing including means for defining thermally insulated first and second zones and enclosing plates extending within said zones for supporting foods to be cooled and heated, a first cooling device operatively connected to cool said first zone, a second cooling device operatively connected to cool said second zone, and a heating device operatively connected to heat said second zone, said heating and cooling devices using thermochemical processes and being self-contained on said trolley free of any external power supply, each of said cooling devices respectively comprising a first container for a gas and a second container for a solid reagent able to react with the gas to provide cooling, said first and second containers communicating through a conduit including a valve operable to control gas and reagent contact and cooling, said first container of said first cooling device being disposed in said first zone and said second container of said first cooling device being located remote of said first and second zones, said first container of said second cooling device being located in said second zone, and said second container of said second cooling device being located remote of said first and second zones.

2. A trolley according to claim 1, wherein said heating device comprises a first reservoir for a gas and a second reservoir for a solid product able to react with the gas to provide heating, said first and second reservoirs communicating through a conduit including a valve operable to control gas and product contact and heating, said first reservoir being located in said second zone and said second reservoir being located remote of said first and second zones.

3. A trolley according to claim 2, wherein said first container of said second cooling device and said first reservoir are each configured as plurality of finger-shaped conduits, said conduits of said first container of said second cooling device being interlaced with said conduits of said first reservoir.

4. A trolley according to claim 2, wherein said plates are horizontally disposed and vertically spaced in said casing, and said first containers and said first reservoir extend substantially perpendicular to said plates.

5. A trolley according to claim 2, wherein said plates are horizontally disposed in said casing, at least one of said plates being associated with at least one first container and at least one first reservoir, each of said at least one first container and said at least one first reservoir being respectively formed as a communicating array of spaced sub-containers or as a communicating array of spaced sub-reservoirs, and each of said sub-containers and sub-reservoirs extending below and in parallel relationship with an associated plate.

6. A trolley according to claim 1, wherein said plates are horizontally disposed and vertically spaced in said casing, and said first containers extend in a direction perpendicular to the plates.

7. A trolley according to claim 1, wherein said plates are horizontally disposed in said casing, one of said first containers is associated with each of said plates, and each of said first containers is formed as a communicating array of spaced sub-containers, each of said first containers extending in parallel relationship with and below an associated plate.

8. A trolley comprising a casing including means for defining thermally insulated first and second zones and enclosing plates extending within said zones for supporting foods to be cooled and heated, a first cooling device operatively connected to cool said first zone, a second cooling device operatively connected to cool said second zone, and a heating device operatively connected to heat said second zone, said heating and cooling devices using thermochemical processes and being self-contained on said trolley free of any external power supply, each of said cooling devices respectively comprising a first container for a gas and a first solid reagent able to react with the gas and a second container for a solid reagent able to react more vigorously with the gas than the first solid reagent to provide cooling, said first and second containers communicating through a conduit including a valve operable to control gas and reagent contact and cooling, said first container of said first cooling device being disposed in said first zone and said second container of said first cooling device being located remote of said first and second zones, said first container of said second cooling device being located in said second zone, and said second container of said second cooling device being located remote of said first and second zones.

9. A trolley according to claim 8, wherein said heating device comprises a first reservoir for a gas and a solid product able to react with the gas and a second reservoir for a second solid product able to react more vigorously with the gas than the first solid product to provide heating, said first and second reservoirs communicating through a conduit including a valve operable to control gas and product contact and heating, said first reservoir being located in said second zone and said second reservoir being located remote of said first and second zones.

10. A trolley according to claim 9, wherein said first container of said second cooling device and said first reservoir are each configured as a plurality of finger-shaped conduits, said conduits of said first container of said second cooling device being interlaced with said conduits of said first reservoir.

11. A trolley according to claim 9, wherein said plates are horizontally disposed and vertically spaced in said casing, and said first containers and said first reservoir extend substantially perpendicular to said plates.

12. A trolley according to claim 9, wherein said plates are horizontally disposed in said casing, at least one of said plates being associated with at least one first container and at least one first reservoir, each of said at least one first container and said at least one first reservoir being respectively formed as a communicating array of spaced sub-containers or as a communicating array of spaced sub-reservoirs, and each of said sub-containers and sub-reservoirs extending below and in parallel relationship with an associated plate.

13. A trolley according to claim 8, wherein said plates are horizontally disposed and vertically spaced in said casing, and said first containers extend in a direction perpendicular to the plates.

14. A trolley according to claim 8, wherein said plates are horizontally disposed in said casing, one of said first containers is associated with each of said plates, and each of said first containers is formed as a communicating array of spaced sub-containers, each of said first containers extending in parallel relationship with and below an associated plate.

* * * * *

UNITED STATES PATENT AND TRADEMARK OFFICE
CERTIFICATE OF CORRECTION

PATENT NO. : 6,427,761 B1
DATED : August 6, 2002
INVENTOR(S) : Rene Georges

It is certified that error appears in the above-identified patent and that said Letters Patent is hereby corrected as shown below:

<u>Title page,</u>
Item [87], the PCT Publication Date is -- Jan. 28, 1999 --.
Item [56], FOREIGN PATENT DOCUMENTS, the following reference is to be added:

-- FR            887775            11/1943 --.

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,427,761 B1
DATED         : August 6, 2002
INVENTOR(S)   : Rene Georges It is certified that error appears in the above-identified patent and that said Letters Patent is hereby corrected as shown below:

Title page,
Item [73], the Assignee is -- Societe de Constructions de Materiel Metallique et Electrique-Socamel, Renage (FR) --.
Item [87], the PCT Publication Date is -- Jan. 28, 1999 --.
Item [56], FOREIGN PATENT DOCUMENTS, the following reference is to be added:

-- FR        887775        11/1943 --.

Signed and Sealed this

Twenty-sixth Day of August, 2003

JAMES E. ROGAN
*Director of the United States Patent and Trademark Office*